(12) United States Patent
Johnston

(10) Patent No.: US 7,255,300 B2
(45) Date of Patent: Aug. 14, 2007

(54) METHOD AND APPARATUS FOR WINDING A FILTER MEDIA PACK

(75) Inventor: Stan Johnston, Kearney, NE (US)

(73) Assignee: Baldwin Filters, Inc., Kearney, NE (US)

(*) Notice: Subject to any disclaimer, the term of this patent is extended or adjusted under 35 U.S.C. 154(b) by 0 days.

(21) Appl. No.: 10/979,987

(22) Filed: Nov. 3, 2004

(65) Prior Publication Data
US 2006/0151655 A1   Jul. 13, 2006

(51) Int. Cl.
B65H 59/38   (2006.01)

(52) U.S. Cl. .............................. 242/412.1; 242/532.3; 242/546; 242/527

(58) Field of Classification Search ............... 242/412, 242/412.1, 413, 413.1, 415, 532.3, 534, 544, 242/546, 526, 527, 527.2
See application file for complete search history.

(56) References Cited

U.S. PATENT DOCUMENTS

| | | | |
|---|---|---|---|
| 3,025,963 | A | 3/1962 | Bauer |
| 3,438,588 | A | 4/1969 | Steinholtz et al. |
| 4,253,228 | A | 3/1981 | Easley |
| 4,498,989 | A | 2/1985 | Miyakawa et al. |
| 4,589,983 | A | 5/1986 | Wydevan |
| 4,720,292 | A | 1/1988 | Engel et al. |
| 5,238,474 | A | 8/1993 | Kahlbaugh et al. |
| 5,245,897 | A | 9/1993 | Arnold et al. |
| 5,374,006 | A * | 12/1994 | Mheidle .................. 242/413.1 |
| 5,435,870 | A | 7/1995 | Takagaki et al. |
| 5,484,466 | A | 1/1996 | Brown et al. |
| 5,543,007 | A | 8/1996 | Takagaki et al. |
| 5,792,247 | A | 8/1998 | Gillingham et al. |
| 5,820,646 | A | 10/1998 | Gillingham et al. |
| 5,895,574 | A | 4/1999 | Friedmann et al. |

(Continued)

FOREIGN PATENT DOCUMENTS

JP   S60-112320   7/1985

(Continued)

OTHER PUBLICATIONS

U.S. Appl. No. 10/979,401, Nov. 2, 2004, Brown.

(Continued)

*Primary Examiner*—Patrick Mackey
*Assistant Examiner*—William E. Dondero
(74) *Attorney, Agent, or Firm*—Reinhart Boerner Van Deuren P.C.

(57) ABSTRACT

A method and apparatus are provided, for forming a filter element including a media pack in the form of a coiled web of fluted filter media, by feeding the web of fluted filter media at a controlled linear speed onto a mandrel rotated by a winding motor providing a controlled driving torque to the mandrel, to thereby maintain a controlled tension on the web of fluted filter media as the web is wound onto the mandrel. The web may be fed at a substantially constant linear speed to the mandrel, and/or the winding motor may be controlled in a manner providing substantially constant driving torque to the mandrel for maintaining a constant tension on the web as a function of the constant driving torque. Coiled media packs having circular or non-circular cross sections, can be formed with either cored, or core-less construction.

15 Claims, 15 Drawing Sheets

U.S. PATENT DOCUMENTS

| | | | |
|---|---|---|---|
| 5,902,364 A | 5/1999 | Tokar et al. | |
| 6,179,890 B1 * | 1/2001 | Ramos et al. | 55/482 |
| 6,190,432 B1 | 2/2001 | Gieseke et al. | |
| 6,221,122 B1 | 4/2001 | Gieseke et al. | |
| 6,235,195 B1 | 5/2001 | Tokar | |
| 6,368,374 B1 | 4/2002 | Tokar et al. | |
| 6,416,605 B1 * | 7/2002 | Golden | 156/192 |
| 6,447,567 B1 | 9/2002 | Ehrenberg | |
| 6,517,598 B2 | 2/2003 | Anderson et al. | |
| 6,533,845 B2 | 3/2003 | Tokar et al. | |
| 6,610,117 B2 | 8/2003 | Gieseke et al. | |
| 6,610,126 B2 | 8/2003 | Xu et al. | |
| 6,610,177 B2 | 8/2003 | Tsay et al. | |
| 6,673,136 B2 | 1/2004 | Gillingham et al. | |
| 6,743,317 B2 | 6/2004 | Wydeven | |
| 6,746,518 B2 | 6/2004 | Gieseke et al. | |
| 6,783,565 B2 | 8/2004 | Gieseke et al. | |
| 6,966,940 B2 | 11/2005 | Krisko et al. | |
| 2002/0100262 A1 | 8/2002 | Gieseke et al. | |
| 2003/0146149 A1 | 8/2003 | Binder et al. | |
| 2003/0217534 A1 | 11/2003 | Krisko et al. | |
| 2004/0071940 A1 | 4/2004 | Frey | |
| 2004/0118771 A1 | 6/2004 | Schukar et al. | |
| 2006/0091061 A1 | 5/2006 | Brown | |
| 2006/0091064 A1 | 5/2006 | Brown et al. | |
| 2006/0091066 A1 | 5/2006 | Driml et al. | |
| 2006/0091084 A1 | 5/2006 | Merritt et al. | |

FOREIGN PATENT DOCUMENTS

| | | |
|---|---|---|
| JP | S60-124622 | 8/1985 |
| JP | 63-122617 | 6/1988 |
| JP | HEI 2-31131 | 8/1990 |
| WO | WO 01/37963 A1 | 5/2001 |
| WO | WO 03/047722 A2 | 6/2003 |

OTHER PUBLICATIONS

U.S. Appl. No. 10/979,876, filed Nov. 2, 2004, Brown et al.
U.S. Appl. No. 10/979,987, Nov. 3, 2004, Johnston.
U.S. Appl. No. 11/355,064, Feb. 15, 2006, Wydeven et al.
U.S. Appl. No. 11/357,788, filed Feb. 17, 2006, Merritt.

* cited by examiner

METHOD AND APPARATUS FOR WINDING A FILTER MEDIA PACK

FIELD OF THE INVENTION

This invention relates to fluid filters for removing particulate matter from a flow of fluid in liquid or gaseous form, including filters of the type used for filtering inlet air supplied to machinery such as engines and compressors, and more particularly to an apparatus and method for winding a filter media pack for use in such filters.

BACKGROUND OF THE INVENTION

Filters of the type used for filtering particulate matter from engine intake air sometimes include one or more layers of a porous filter material that is formed into a convoluted pattern, often referred to in the industry as fluted filter media. The fluted filter media sometimes also includes one or more additional layers of non-corrugated material attached to the convoluted filter material. These additional sheets are known by various names, such as face sheets, or backing sheets, and may be formed from either porous or non-porous material.

In one commonly used form of filter element, a length of the fluted filter media is wound about an axis into a coiled shape to form a media pack having one axial end adapted for receiving a flow of fluid and the other axial end adapted for discharging the fluid after it is filtered by the fluted filter media forming the media pack. After formation of the coiled media pack, secondary operations may be performed, to add seals or mounting provisions to the media pack, to form a filter element that can be inserted into a filter housing that directs a flow of fluid through the filter element.

As part of the process of forming a coiled filter pack for a filter element, a number of operations must typically be performed, such as trimming the fluted filter media to form a leading edge of the media, attaching the leading edge to a mandrel used for winding the coiled filter pack, feeding a predetermined length of the media to the mandrel during winding, trimming the media a second time to form a trailing edge of the media, securing the trailing edge to the filter pack, and applying adhesives or sealants to portions of the media as it is wound into a coil. In forming the leading and trailing edges, it is desirable to trim the media directly through a peak of the convolutions forming the fluted media, to thereby form a half-peak at the leading and trailing edges that can be filled with an adhesive or sealant. It is also desirable to control the tension on the media during winding to ensure that the flutes of the underlying layers are not crushed in the process of winding the subsequent layers, and to provide uniformity in the final shape and size of the coiled media pack.

Because the filter element incorporating the media pack is generally disposable, and because there are typically multiple sources from whom a consumer may purchase replacement filter elements, it is desirable to automate the process of winding the media pack, so that the manufacturing cost and selling price of the filter element can be minimized. Prior approaches to automating the process of winding such media packs have not been entirely satisfactory, however, particularly where the media pack has a cross-section that is other than round, such as square, rectangular, oval, or race-track shaped with a rectangular central section joining rounded ends.

In general, prior approaches have relied upon undesirably complex conveyor mechanisms and machinery for performing some of the required operations, and have not been capable of providing many of the desired operations in an automated form. As a result, some operations, such as trimming the media to length have had to be performed by hand, which heretofore precluded fully taking advantage of manufacturing opportunities such as feeding the media from a large master roll of the media. Prior approaches have also not allowed for adequate control of the tension in the media during winding.

It is desirable, therefore, to provide an improved apparatus and method for forming a filter media pack by winding a fluted filter media into a coil.

BRIEF SUMMARY OF THE INVENTION

The invention provides an improved method and apparatus for forming a filter element including a media pack in the form of a coiled web of fluted filter media, by feeding the web of fluted filter media at a controlled linear speed onto a mandrel rotated by a winding motor providing a controlled driving torque to the mandrel, to thereby maintain a controlled tension on the web of fluted filter media as the web is wound onto the mandrel. The web of filter material may be fed at a substantially constant linear speed to the mandrel, and/or the winding motor may be controlled in a manner providing substantially constant driving torque to the mandrel for maintaining a constant tension on the web as a function of the constant driving torque. The invention may be used for forming coiled media packs having circular or non-circular cross sections, and coiled media packs that are core-less or coiled media packs that are wound around a central core.

The invention allows the mandrel to rotate at varying rotational speeds while being driven with constant driving torque. This is particularly advantageous when winding a non-circular coiled web of fluted filter media onto the mandrel, because complex transport structures, such as the conveyors required in prior methods and apparatuses, are not required, and because tension in the web can be accurately controlled during winding.

An apparatus or method according to the invention may also include provisions for accurately feeding a pre-determined length of the web of media to the mandrel during winding, and provisions for positioning the web with respect to a cutter for severing the web through one of the peaks of the fluted media, to thereby form a half-peak that can be readily filled with an adhesive/sealant. The half-peaks may be provided at the leading and/or trailing edges of the web. According to one aspect to the invention, the trailing edge of the web for one filter pack may be formed simultaneously with the leading edge of the next filter pack to be wound, by the operation of severing the web through one of the peaks.

An apparatus or method according to the invention may also include a movable web guide apparatus for guiding the web into alignment with the mandrel, and/or an applicator for applying a bead of adhesive/sealant to the web during winding. According to an aspect of the invention, the web guide is movable away from the mandrel, after attachment of the web to the mandrel, to provide clearance for rotation of the mandrel and filter pack being wound on the mandrel.

An apparatus or method according to the invention may include an AC vector motor, operating in a torque mode, as a winding motor providing torque to the mandrel, and/or a web feeder having a cogged roller attached thereto for driving the web of media. The web feeder may include an encoder for use in accurately positioning the web along the feed path, to facilitate severing and adhesive application operations, and for determining when a predetermined length of the web has been fed to the mandrel.

Other aspects, objectives and advantages of the invention will be apparent from the following detailed description and the accompanying drawings.

BRIEF DESCRIPTION OF THE DRAWINGS

FIG. 14 is a top view of a mandrel and web guide arms of the apparatus of FIG. 1, according to the invention.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 15:
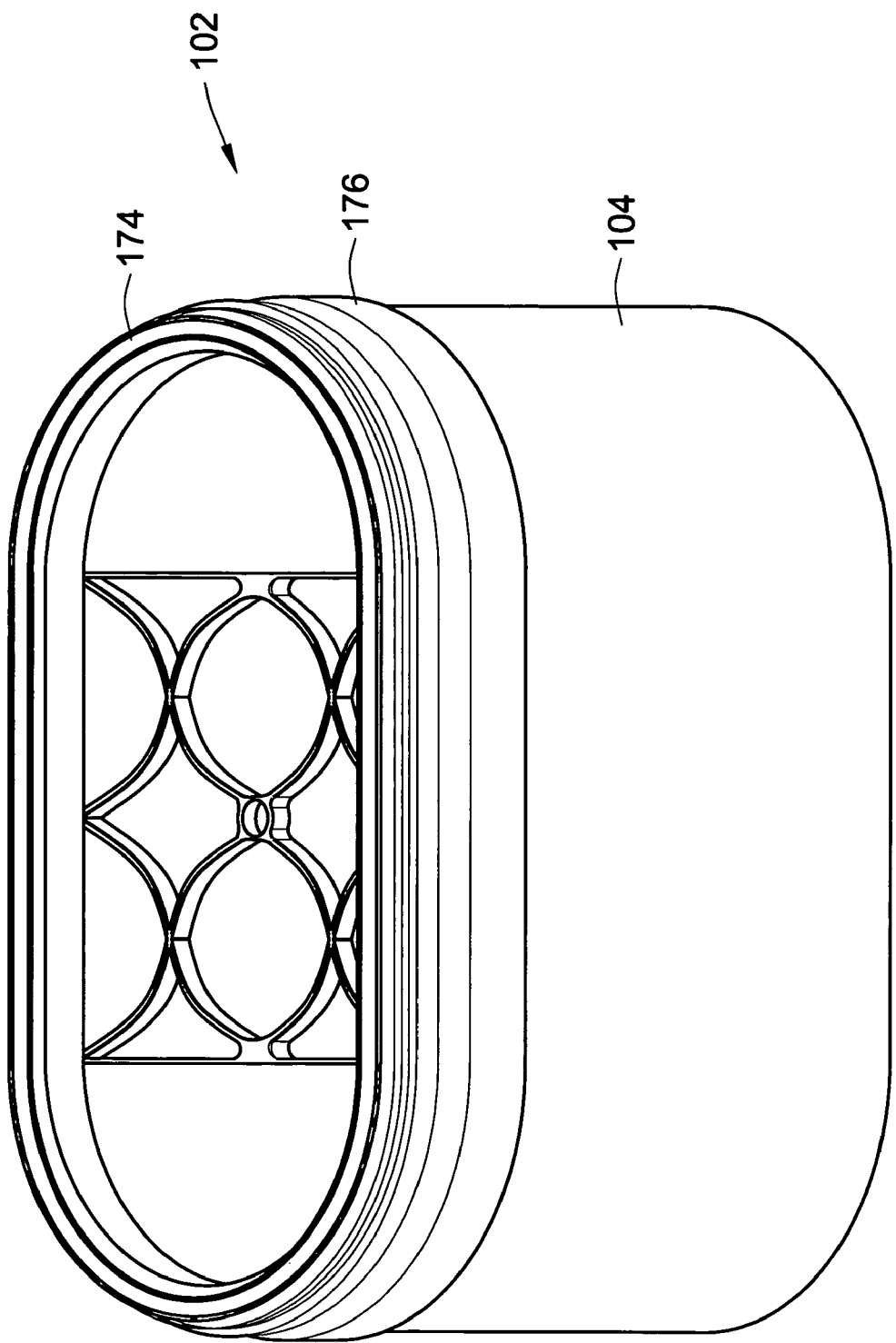
FIG. 15 is a perspective view of a filter element including a media pack, as wound by the apparatus of FIG. 1, according to the invention, in the manner illustrated in FIGS. 2-10.
Figure 16:
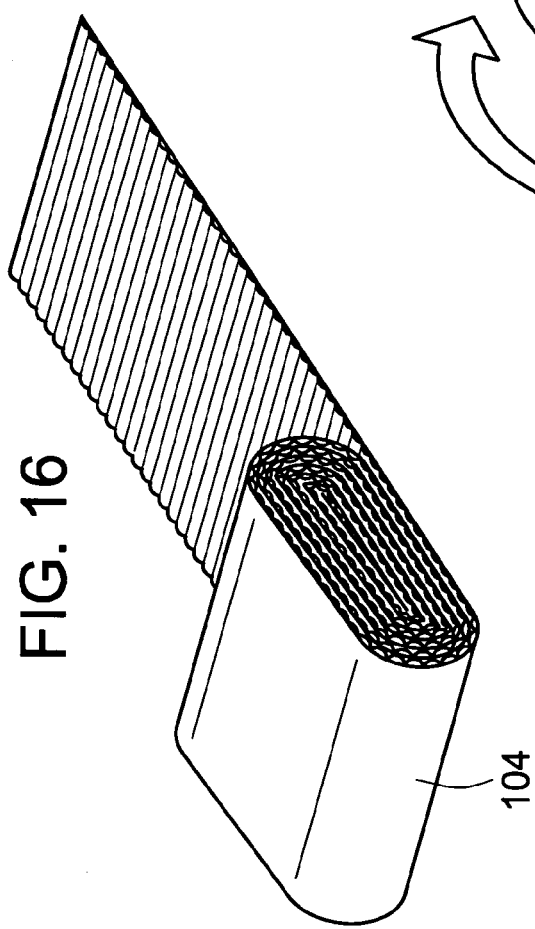
FIG. 16 is a perspective view of a core-less media pack, having a non-circular cross section, as formed by the apparatus of FIG. 1, according to the invention, in the manner illustrated in FIGS. 2-10.

FIGS. 1-14 show various structural and operational aspects of an exemplary embodiment of the invention in the form of a winding apparatus 100 for forming a filter element 102, as shown in FIG. 15, including a filter pack 104, as shown in FIG. 16, in the form of a coiled web 106 of fluted filter media 108. As will be understood from the following description, the winding apparatus 100 of the exemplary embodiment performs a number of functions in addition to simply winding the web 106 of fluted filter material onto the mandrel 112. The term winding apparatus is used herein to aid in the description of an apparatus and method according to the invention, and is not intended to be limiting with respect to practicing the invention.

Figure 11:
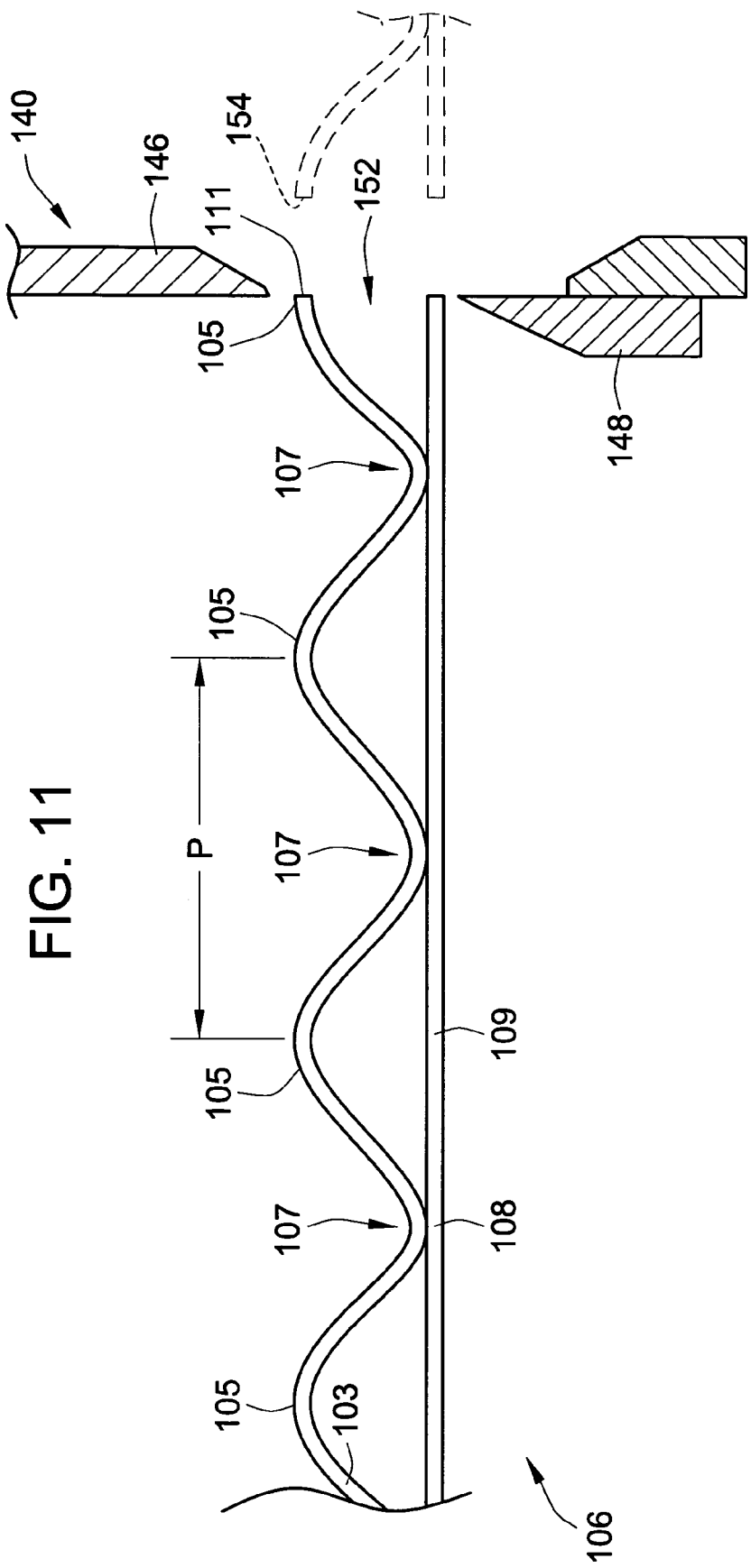
FIGS. 11 and 12 are enlarged views showing features of a web of fluted filter material, used in conjunction with FIGS. 2-10, for illustrating operation of the apparatus of FIG. 1.
Figure 12:
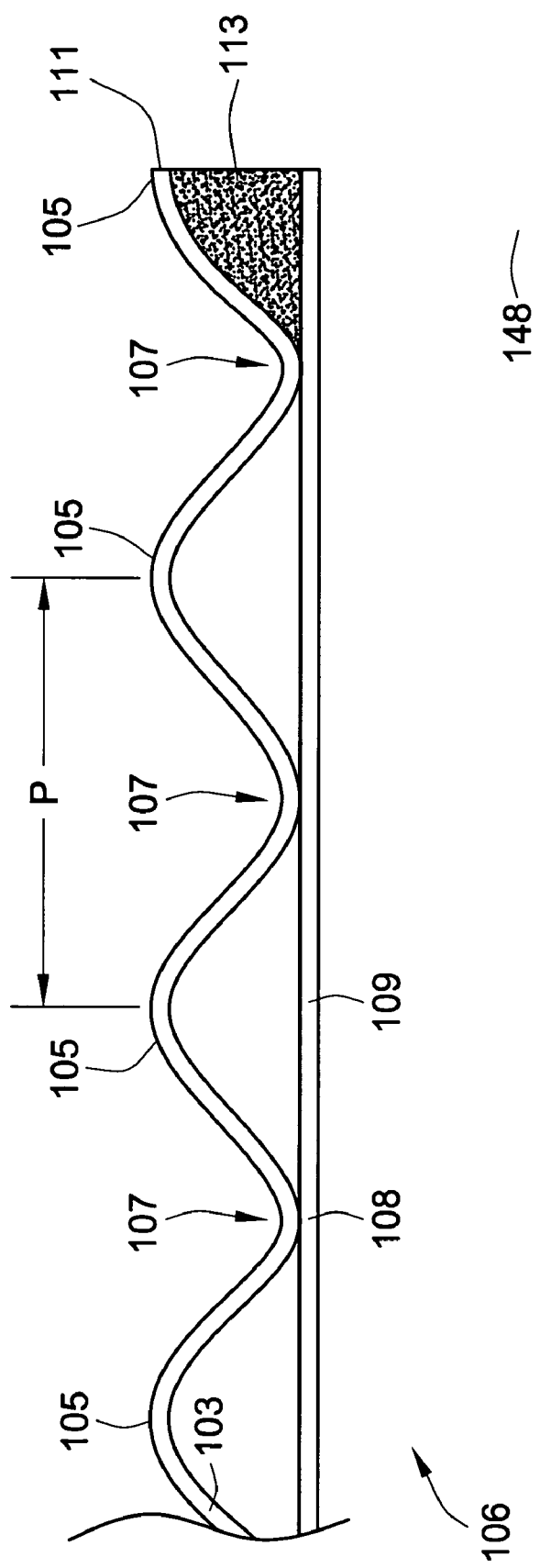
Figure 13:
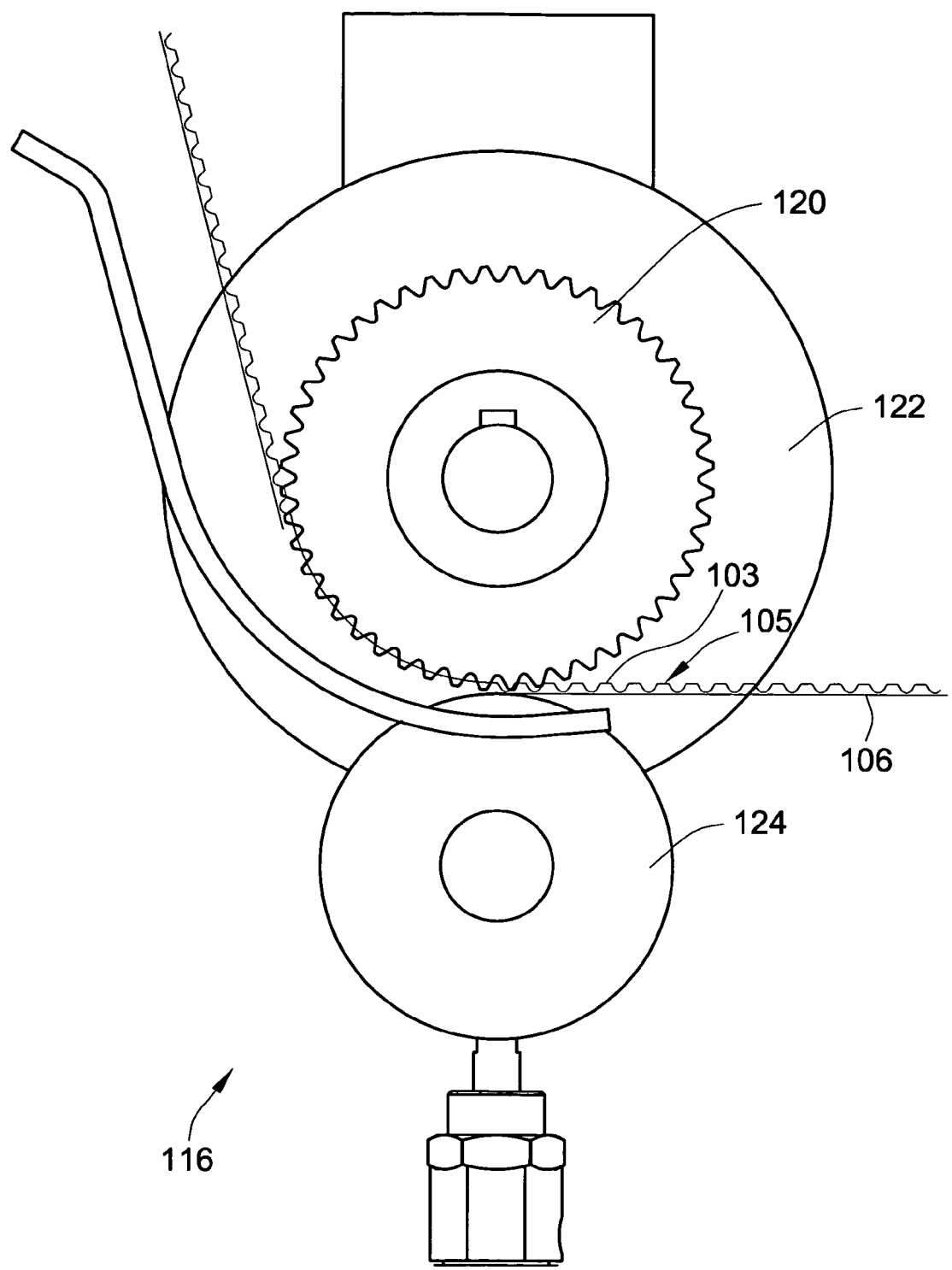
FIG. 13 is an enlarged view of a portion of a web feeder of the apparatus of FIG. 1, according to the invention.
Figure 17:
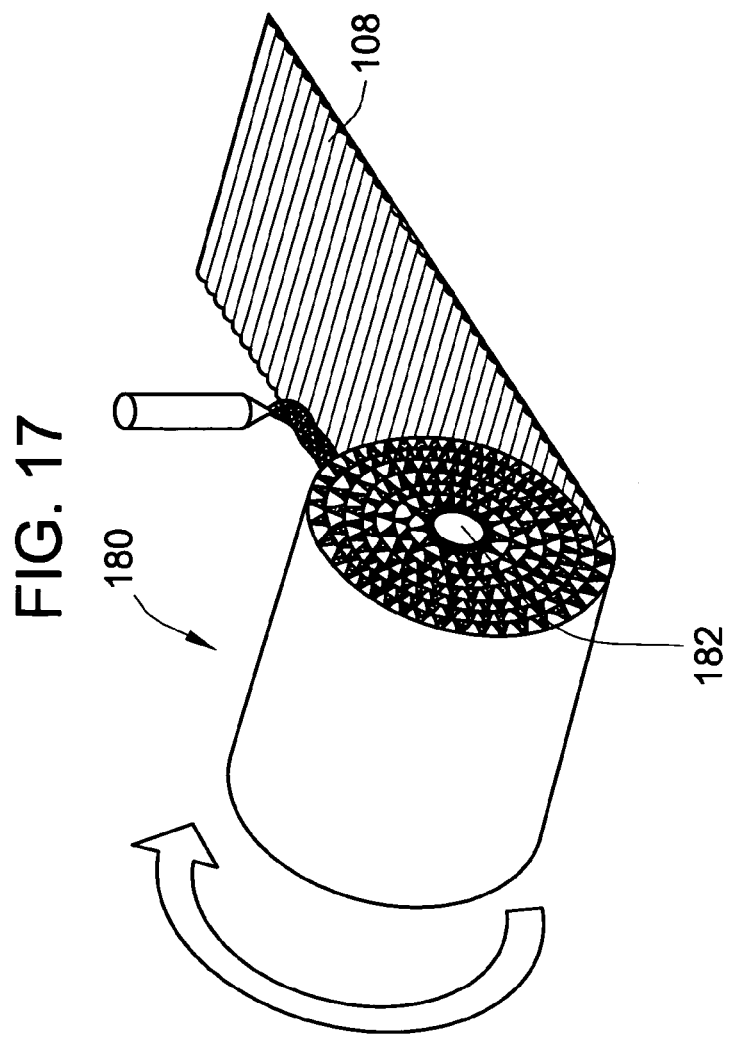
FIG. 17 is a perspective view of an exemplary representation of a media pack, having a circular cross-section and wound around a central core, which can be formed by the winding apparatus of FIG. 1.

As will be understood from the following description, the invention may be used for winding filter packs having non-circular cross sections, such as the race-track shaped filter pack 104 shown in FIG. 16, or filter packs 110 having circular cross sections, as shown in FIG. 17. As shown in FIGS. 11 and 12, the fluted filter media 108, used herein for describing the exemplary embodiment of the invention, includes a convoluted sheet 103 of porous filter material forming peaks 105 and valleys 107, attached to a face sheet 109 of porous filter material, with adjacent peaks 105 being regularly spaced from one another at a pitch 'P' of the web 106. As will be understood by those having skill in the art, the invention may also be used with other types of filter media, in other embodiments of the invention. The convoluted sheet 103 may be formed by any appropriate process, such as corrugating or pleating, but preferably by gathering, as described in a United States patent application, entitled "Gathered Filter Media and Method of Making Same," bearing the attorney docket no. 502854, assigned to the Assignee of the present invention, and incorporated herein by reference.

As shown in FIGS. 1-10, the winding apparatus 100 includes a mandrel 112, mounted for rotation about an axis 114 of the mandrel 112, a web feeder 116 for feeding the web 106 of fluted filter media 108 at a controlled linear speed, onto the mandrel 112, and a winding motor 118 operatively connected to the mandrel 112 for providing a controlled driving torque to the mandrel 112, to thereby maintain a controlled tension on the web 106 of fluted filter media as the web 106 is wound onto the mandrel 112. In the exemplary embodiment, the winding motor 118 is an AC vector motor, operating in a torque mode.

As shown in FIGS. 2-10 and 13, the web drive 116, of the exemplary embodiment, includes cogged drive roller 120, having an outer periphery formed to engage the peaks and valleys 103, 105 of the web 106, driven by a web drive motor 122. The web drive 116 also includes a pinch roller 124, for holding the web 106 in engagement with the cogged drive roller 120, an idle roller 126 and a master roll support apparatus 128. The master roll support apparatus 128 of the exemplary embodiment is configured for mounting a large master roll 130 of the web 106 of filter media about a master roll axis 132, so that the web drive 116 can continuously feed the web 106 to the mandrel 112, along a feed direction 134 of the winding apparatus 100.

The idle roller 126 is disposed between the master roll 130 and the cogged drive roller 120, in a position which causes the web 106 of fluted filter media to wrap partially around the periphery of the cogged drive roller 120 in a manner that helps to keep the peaks and valleys 103, 105 of the web 106 drivingly engaged with the cogged drive roller 120, so that the web drive motor 122 can drive the web 106 forward and backward along the feed path 134. The pinch roller 124 is mounted in such a way that a pinch roller actuator 136, in the form of a device such as a pneumatic or hydraulic cylinder, or an electric motor driven ball screw, for example, can move the pinch roller 124 out of engagement with the web 106 to facilitate feeding the web 106 past the cogged drive roller 120, when the web is being initially loaded into the winding apparatus 100.

The web drive motor 122 of the exemplary embodiment is an electric motor having an encoder that allows precise rotational positioning of the cogged drive roller 120, and the ability to precisely monitor the length of web 106 which has been fed in either direction along the feed path 134, toward or away from the mandrel 112. In other embodiments of the invention, however, other types of motors or drive mechanisms, allowing positioning and monitoring of length, may alternatively be used in practicing the invention.

It will be understood by those having skill in the art, that in other embodiments of the invention, a web drive may differ considerably from the web drive 116 of the exemplary embodiment. It is further understood that, although the exemplary embodiment includes provisions for utilizing a large master roll 130 of the fluted filter media 108, to allow continuous feeding of the web 106, the invention may also be practiced, in other embodiments, with smaller master rolls, or with pre-cut lengths of the web 106.

The winding apparatus 100 of the exemplary embodiment also includes a cutter 140, an applicator 142, and a movable web guide apparatus 144, all disposed between the cogged drive wheel 122 and the mandrel 112. The applicator 142 is used for applying a bead of adhesive/sealant 143 to the web 106, during winding of the coiled web 106, in a manner shown in FIGS. 5 and 6, and described in more detail below. The term adhesive/sealant, as used herein, is intended to be inclusive rather than limiting, and includes any material that is applied through the applicator for purposes such as structurally bonding together the layers of a filter pack, according to the invention, or for providing a complete or partial seal against the flow of fluid through a filter pack according to the invention.

The cutter 140, of the exemplary embodiment, includes a pair of jaws 146, 148 operatively connected to be driven by a cutter actuator 150, for severing the web 106 a first and a second time to form leading and trailing edges respectively of the web 106. The jaws 146, 148 of the cutter 140 are disposed along the feed path 134 at a known distance from the web drive motor 122, so that the web drive motor 122 can position a first peak 105 of the web 106 under the cutter 140, in such a manner that the cutter 140 will sever the web through a first one of the peaks 105, to form the a leading edge 152 of the web 106, as shown in FIG. 11, and in similar fashion, through a second one of the peaks 105 to form the trailing edge 154 of the web 106. Severing the web 106 through the peaks 105 in forming the leading an trailing edges 152, 154 is desirable, because the half-peak 111 that is created when the web 106 is severed on one of the peaks 105 can be filled with an adhesive/sealant 113, as shown in FIG. 12, in a manner known in the art, for the purposes of precluding fluid leakage through the half-peak 111, and securing the leading and trailing edges 152, 154 of the coiled web 106 within the filter pack 104.

Those skilled in the art will recognize that, by virtue of the arrangement described above, the web 106 may be severed a first time, on one of the peaks 105, and then the web drive motor 122 can feed out a length of web 106 that is equal to an integer multiple of the pitch P of the web 106, along the feed path 134 toward the mandrel 112, to position a second peak 105 directly under the cutter jaws 146, 148, so that the web 106 may be severed a second time, directly through the second peak 105, to form the trailing edge 154 of the web 106.

In other embodiments of the invention, other types of cutters, such as water jets, saws, lasers, etc. can be used in place of the shear-type cutter shown and described herein with respect to the exemplary embodiment of the winding apparatus 100.

The applicator 142 is preferably located between the cutter 140 and the mandrel 112 spaced slightly beyond an over-travel distance 'D' from the cutter 140, to preclude fouling of the cutter 140 with adhesive/sealant dispensed by the applicator 142 during winding of the filter pack 104. As described in greater detail below, in the exemplary embodiment of the winding apparatus 100, the web drive motor 122 draws the web 106 back past the cutter 140 a distance equal to the over-travel distance D, prior to severing the web 106 the second time to form the trailing edge 154 of the web 106, so that the adhesive/sealant 143 on the web 106 extends virtually from the leading edge 152 to the trailing edge 154 of the coiled web 106. As the web 106 is drawn back the over-travel distance D, the flow of adhesive/sealant 143 through the applicator 142 is preferably stopped, or redirected to a different area of the web 106, so that the bead 143 of adhesive/sealant does not become excessive as the web 106 moves, first forward, and then backward, along the feed path 134. In some embodiments, it may be desirable to have the over-feed distance D be equal to an integer multiple of the pitch P of the web 106.

The web guide web guide 144 includes a pair of arms 156, 158 that are selectively rotated, by a pair of web guide actuators 160, 162, into and out of adjacency with the feed path 134, as described in greater detail below, at a point between the cutter 140 and the mandrel 112, for guiding the leading edge 152 and an adjacent initial length of the web 106 to the mandrel 112, after the first cut is made to sever the web 106, to form the leading edge 152, and after the open half-peak 111 at the leading edge 152 has been filled with adhesive/sealant 113.

As shown in FIG. 14, the mandrel 112 of the exemplary embodiment includes two side plates 166, 168 that are operatively connected to be driven in unison about the axis 114 of the mandrel. Aligned channels 170, 172 are attached to each of the side plates 166, 168 for receiving a portion of the opposing longitudinal edges of the web 106 adjacent the leading edge 152 to secure the leading edge 152 of the web 106 to the mandrel 112. The portion of the web 106 held by its longitudinal edges also forms an initial layer of media over which subsequent layers are wound to form a "coreless" race-track shaped filter pack 104, as shown in FIG. 16. As also shown in FIG. 14, the exemplary embodiment includes two sets of web guide arms 156, 158, with one set operatively mounted respectively adjacent each of the side plates 166, 168.

The winding apparatus 100 also includes a controller 164, operatively connected, as shown by dashed lines in FIGS. 1-10, to the winder motor 118, the web drive motor 122, the cutter actuator 150, the pinch roller actuator 136, the applicator 142, and the actuators 160, 162 for the web guide arms 156, 158, for controlling the various component parts of the winding apparatus 100. The actuators 160, 162 may be provided in many forms, such as a pneumatic or hydraulic cylinder, or an electric motor driven ball screw.

Operation and additional structural features of the winding apparatus 100 will be described, as follows, with reference to FIGS. 2-14, illustrating a sequence of operations related to forming a filter pack 104, having a non-circular cross-section.

Figure 1:
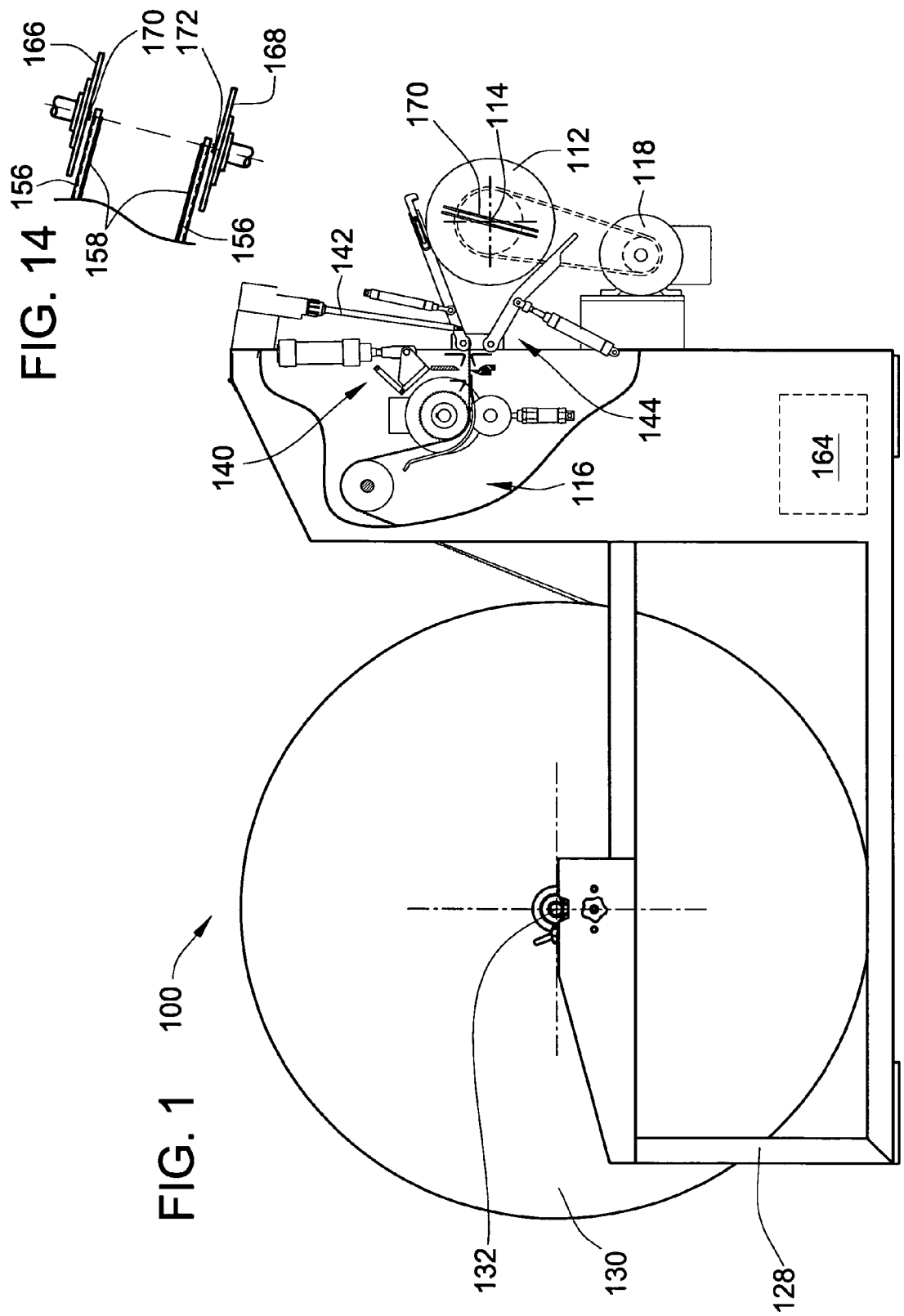
FIG. 1 is partial cutaway view of an exemplary winding apparatus, according to the invention.
Figure 2:
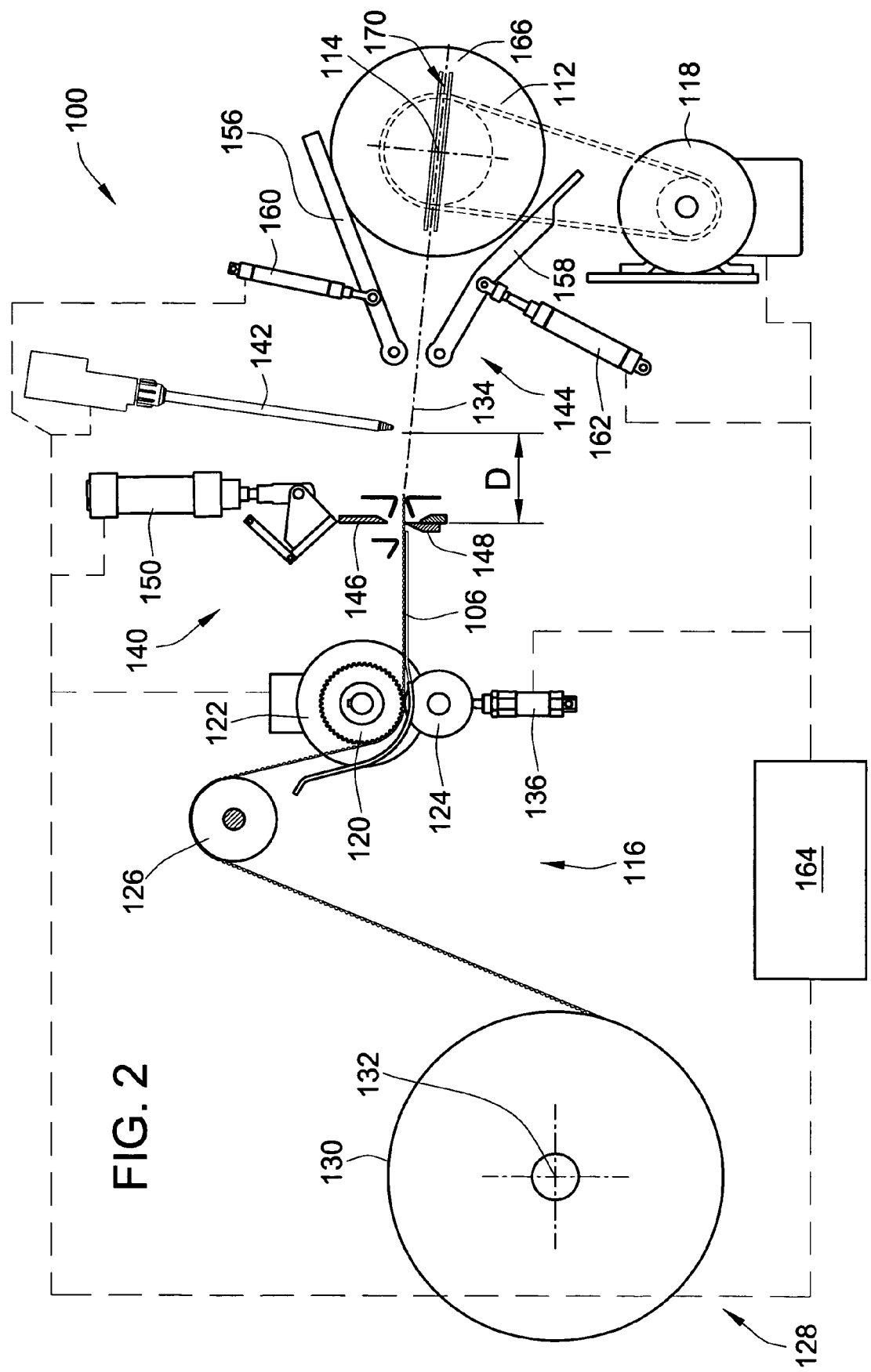
FIGS. 2-10 are schematic views of the winding apparatus of FIG. 1, illustrating various structural and operational aspects of the invention.

As shown in FIG. 2, with the web guide arms 156, 158 located in an open position, after loading the master roll 130 of fluted filter media into the master roll support apparatus 128, for rotation about the master roll axis, 132, the web 106 is fed over the idler roller 126, between the cogged roller 120 and the pinch roller 124 and through the cutter 140. The web 106 is jogged into a position where a first one of the peaks 105 is positioned under the cutter 140, to thereby initialize the positioning of the web 106, and the cutter 140 is actuated to sever the web 106 a first time through the first peak 105, as shown in FIGS. 3 and 11, to form the leading edge 152 of the web 106.

Figure 3:
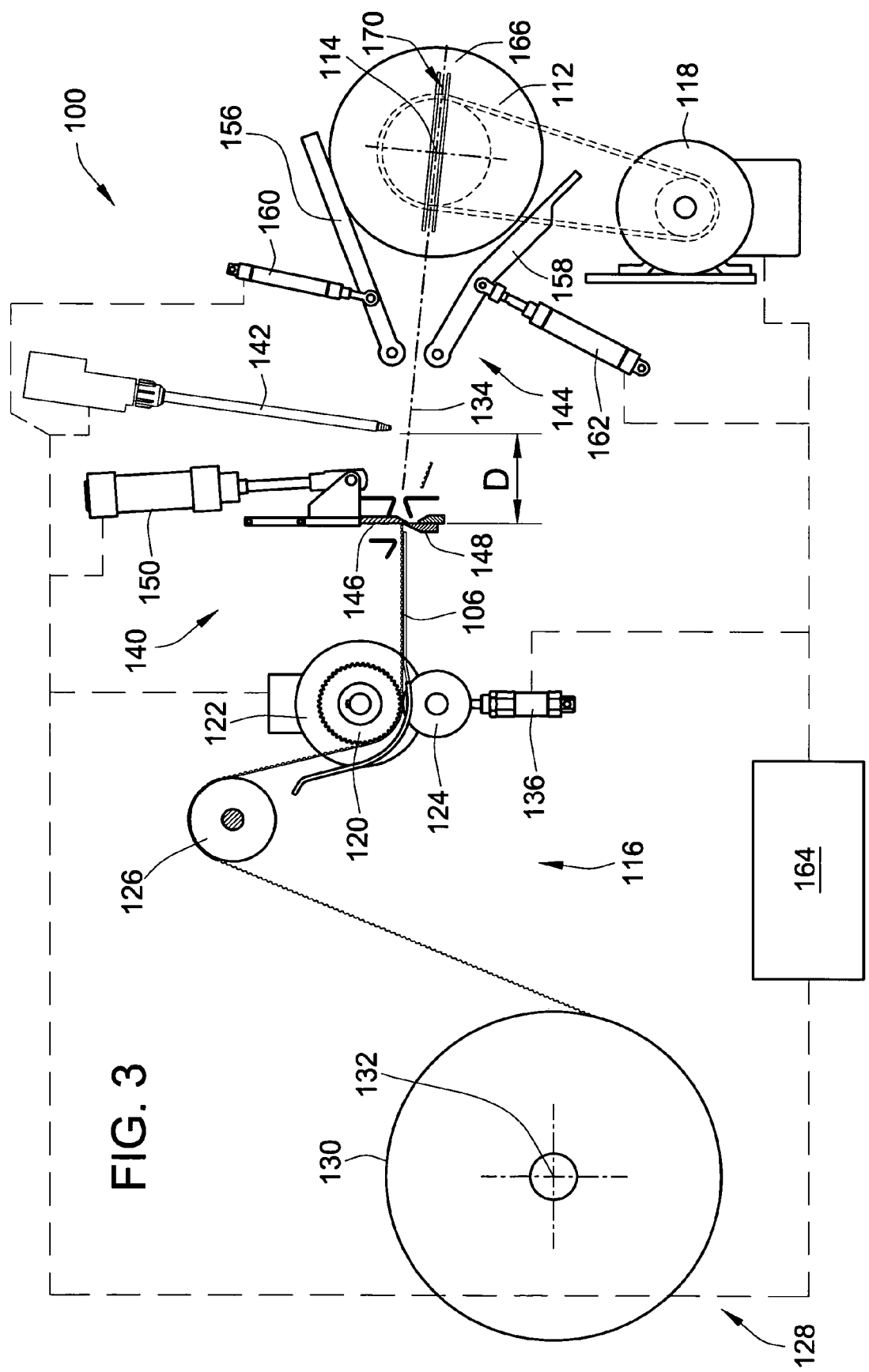
Figure 4:
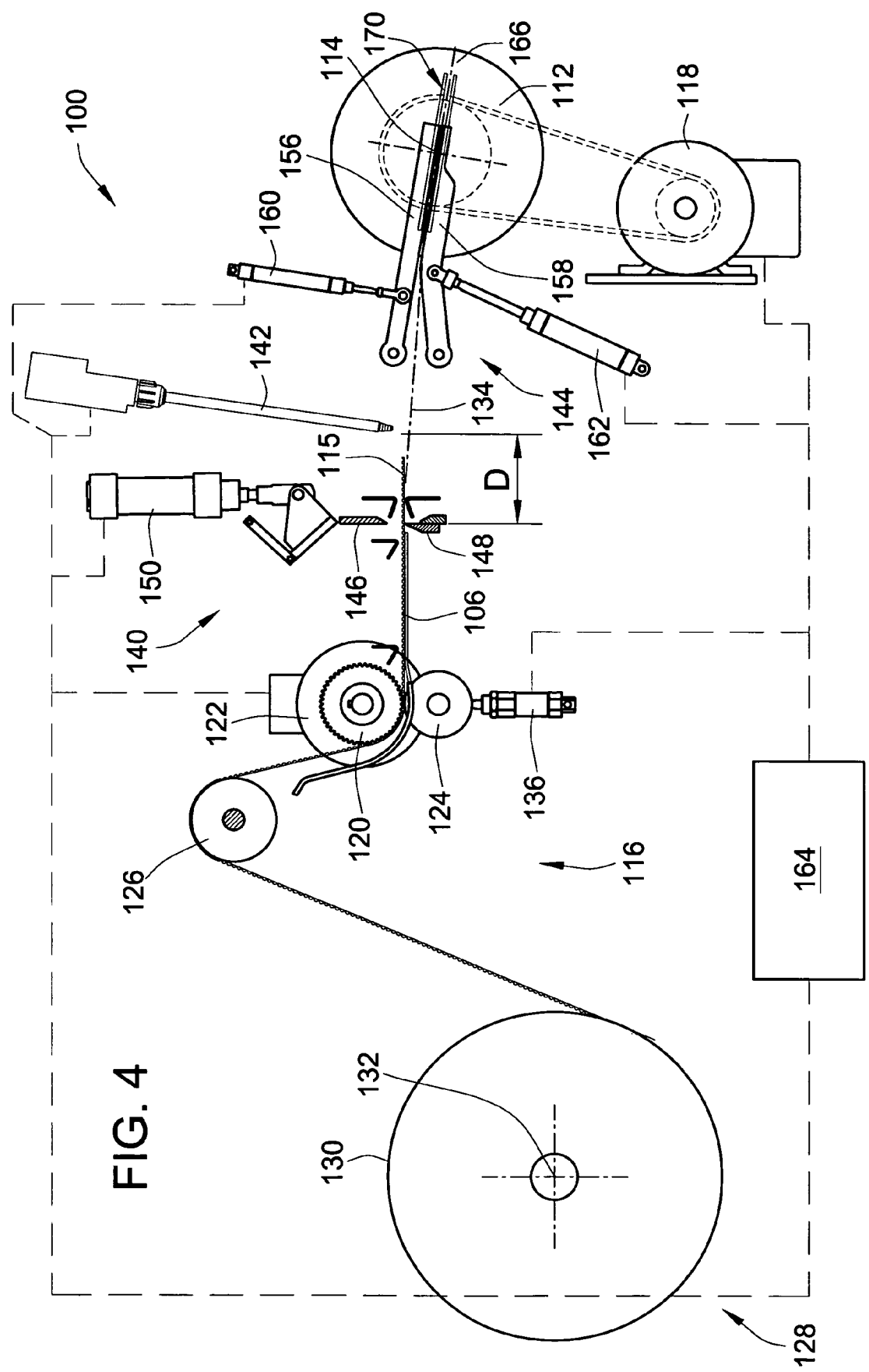

As shown in FIG. 3, the web drive 126 then advances a pre-wind length 115 of web 106 past the cutter 140, for application of an adhesive/sealant 113 in the half-peak 111 forming the leading edge 152 of the web 106. The adhesive/sealant 113 can be applied into the half-peak 111 by any known method, including having an operator of the winding apparatus 100 use a hand-held applicator to fill the half-peak 111 with an adhesive/sealant material such as a urethane material or a hot-melt glue.

Figure 5:
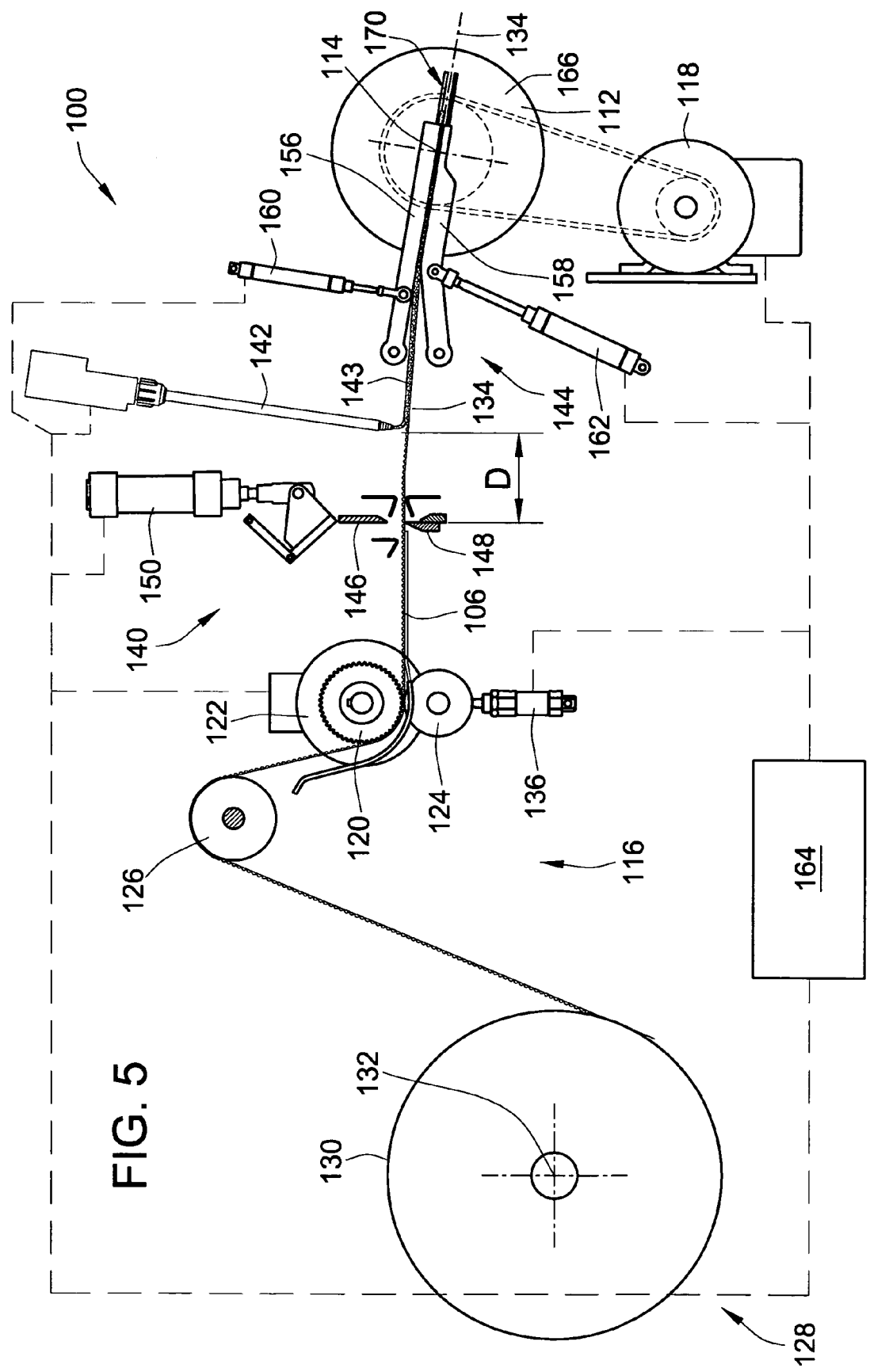

Next, as shown in FIG. 5, the mandrel 112 is rotated to an initial position in which a channels 170, 172 of the mandrel 112 are generally aligned with the feed path 134, the web guide arms 156, 158 are moved to a closed position, and the web feeder 116 feeds an initial length of the web 106 through the web guide arms 156, 158, and into the channels 170, 172 in the mandrel 112. The channels 170, 172 of the mandrel 112 receive the leading edge 152 of the web and a portion of the longitudinal edges of the web 106, adjacent the leading edge 152. As the web is fed into position in the channels 170, 172 in the mandrel 112, the applicator 142 applies a bead 143 of adhesive sealant to the upper face (as shown) of the web 106, at a point spaced far enough laterally inward from the longitudinal edge of the web 106, that the adhesive/sealant 143 will not spread into the channels 170, 172 in the mandrel 112 as the filter pack 104 is wound on the mandrel 112.

Figure 6:
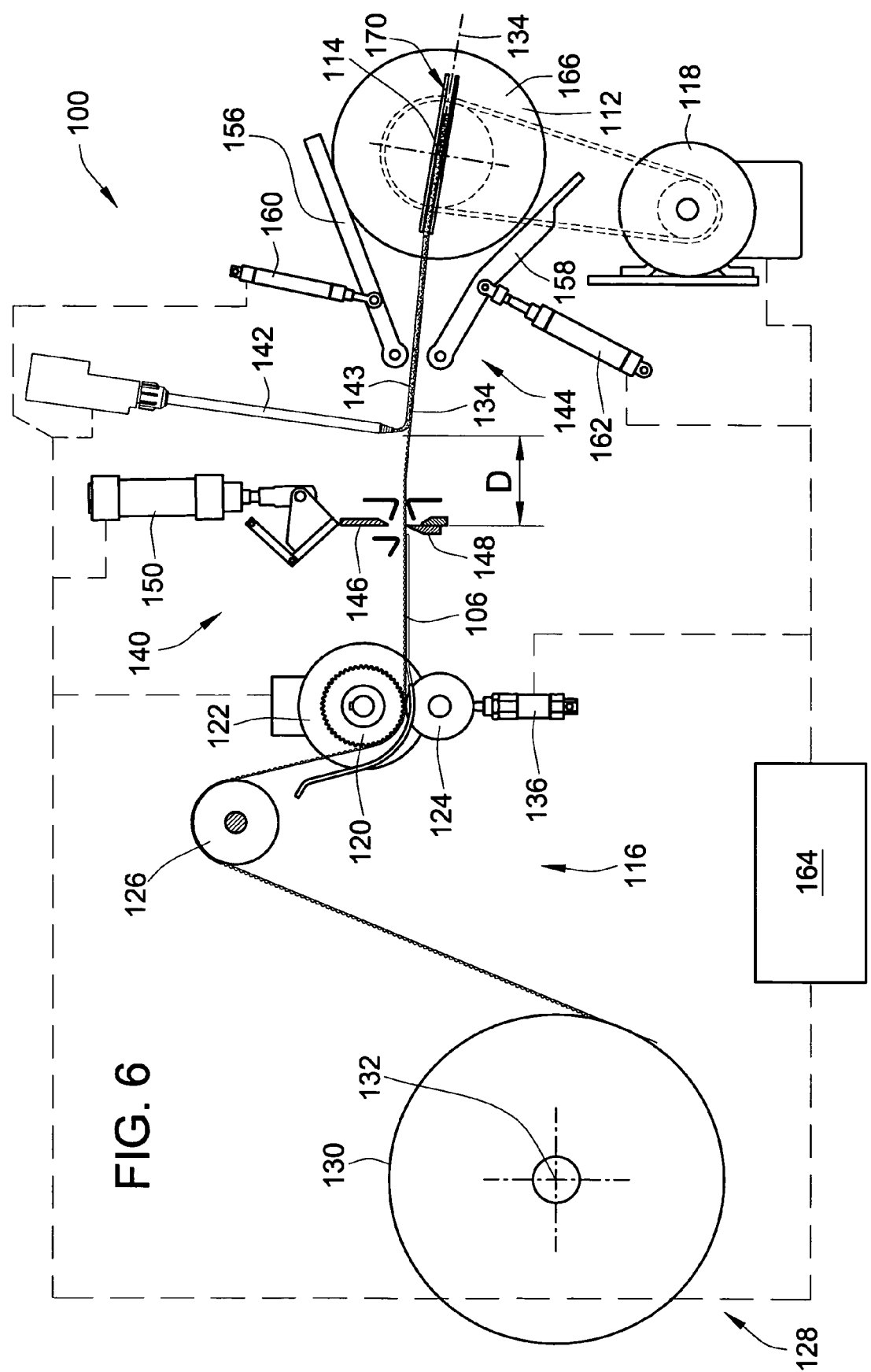
Figure 7:
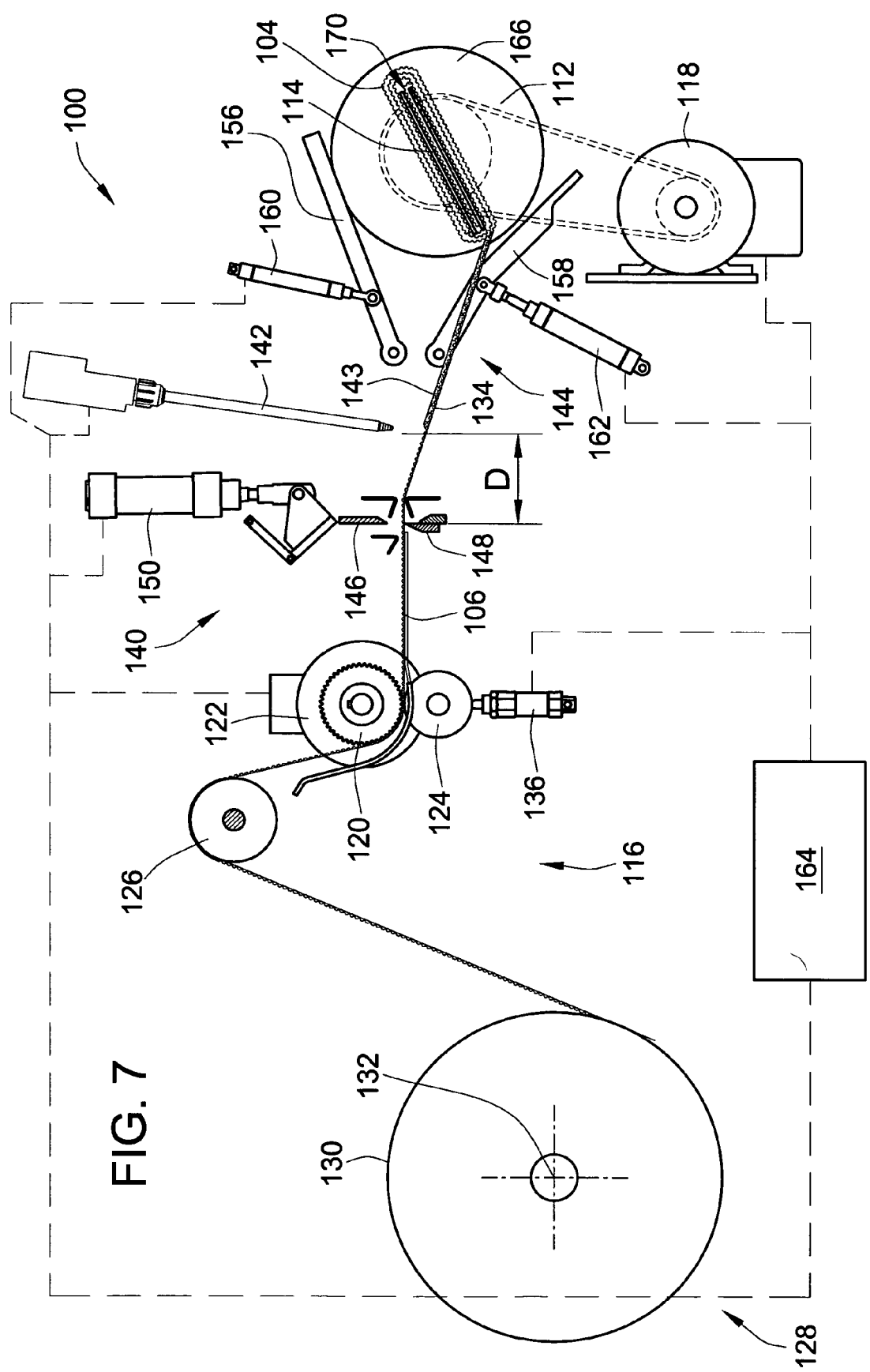

The web guide arms 156, 158 are then moved to the open position, as shown in FIG. 6, and the web drive motor 122 and winding motor 118 are energized to wind the filter pack 104, as shown in FIG. 7. During winding, the web drive motor 122 feeds out a predetermined length of web 106, including an over-travel distance D, as shown in FIG. 7.

During winding, the web drive motor 122 is controlled during winding for feeding the web 106 of fluted filter media at a controlled linear speed onto the mandrel 112, and the winding motor 118 is controlled to provide a controlled driving torque to the mandrel 112, to thereby maintain a controlled tension on the web 106 of fluted filter media as the web 106 is wound onto the mandrel 112. The invention provides the capability to specifically tailor the speed at which the winding apparatus 100 operates to match the abilities of a particular individual operating the apparatus 100, while still maintaining a desired tension in the web 106.

The linear speed at which the web 106 is fed to the mandrel 112, and the driving torque applied to the mandrel 112 can be continually controlled during the winding process, according to a predetermined program to precisely control tension applied to the web 106 at various points during winding of the filter pack 104. It may be desirable, for example, to have a pre-programmed acceleration and deceleration period at the beginning and end of the winding operation, where the linear speed at which the web 106 is fed to the mandrel 112 is respectively increased and decreased at predetermined rates. Either or both of the winding motor 118, or the controller 164 may include sensors or circuitry for sensing the driving torque of the winding motor 118.

In general, it is contemplated that the driving torque to the mandrel 112 will preferably be maintained at a substantially constant value during winding, regardless of the linear speed at which the web 106 is being fed to the mandrel 112. The driving torque will cause the rotational speed of the mandrel 112 to vary, and allow the mandrel 112 to accelerate and decelerate, as required, to maintain a constant tension in the web 106 as the feed speed varies, as will inherently occur, for example, when winding a media pack with a non-circular cross section.

In one embodiment, it is contemplated that the web 106 may simply be fed to the mandrel 112 at a substantially constant linear speed, during winding, and the winding motor 118 may be controlled to provide a substantially constant torque. The terms substantially constant linear speed and torque are intended to mean that, except for brief periods of acceleration and deceleration at the beginning and end the winding operation, the linear speed will be held at a constant value, and the driving torque will be held at a constant values. The value of substantially constant linear speed for feeding the web 106 can be selected, and adjusted, to allow individual operators the flexibility to match the winding speed to their respective skill in operating the winding apparatus 100. The value of substantially constant torque can be selected to provide a desired tension on the web 106 during winding, virtually independent of the skill of the operator, so that the coiled filter packs 104 will have a substantially uniform size and shape when completed, and to preclude crushing of the inner layers of the media 108 by excessive tension in the outer layers.

Figure 8:
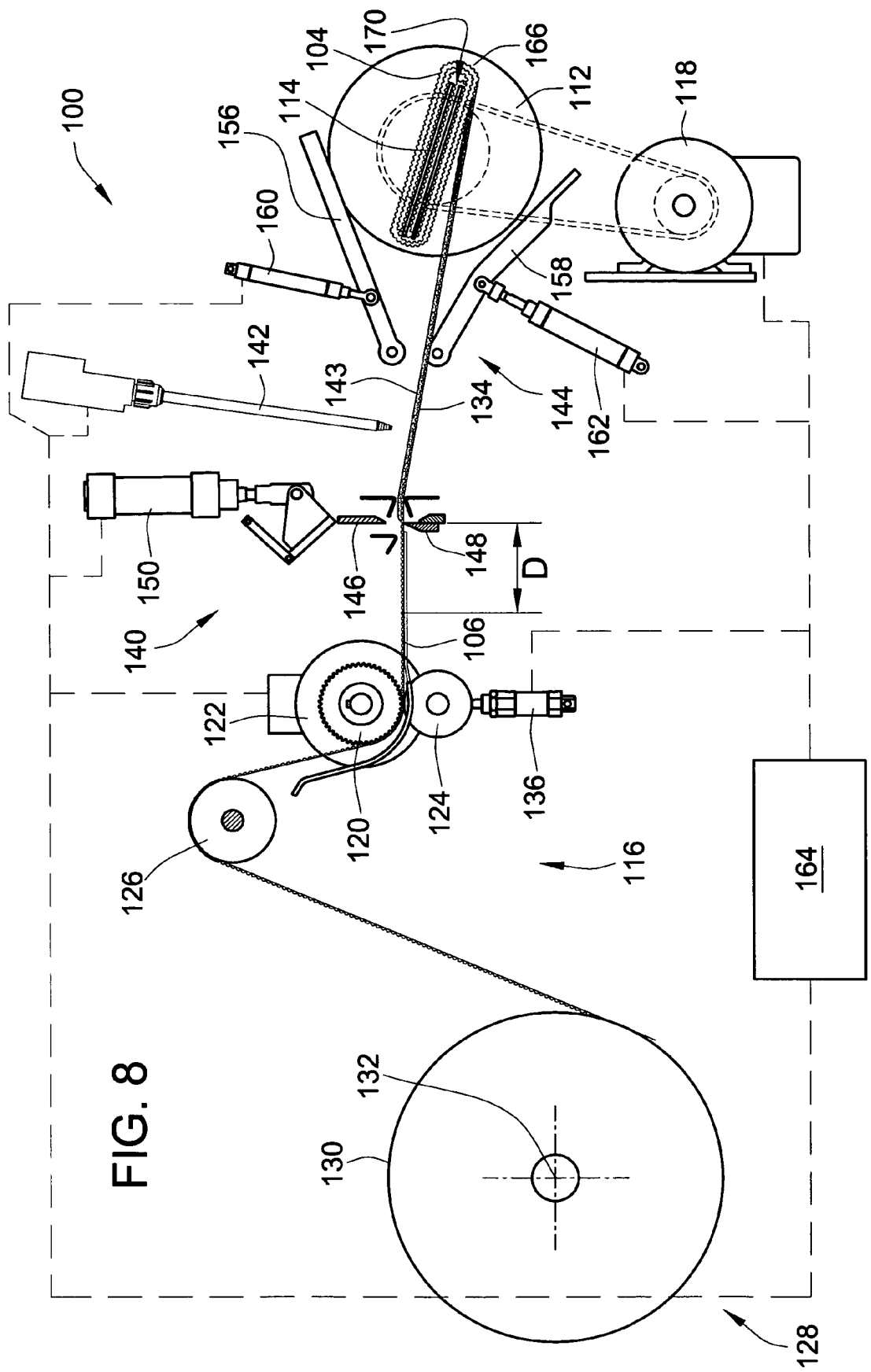
Figure 9:
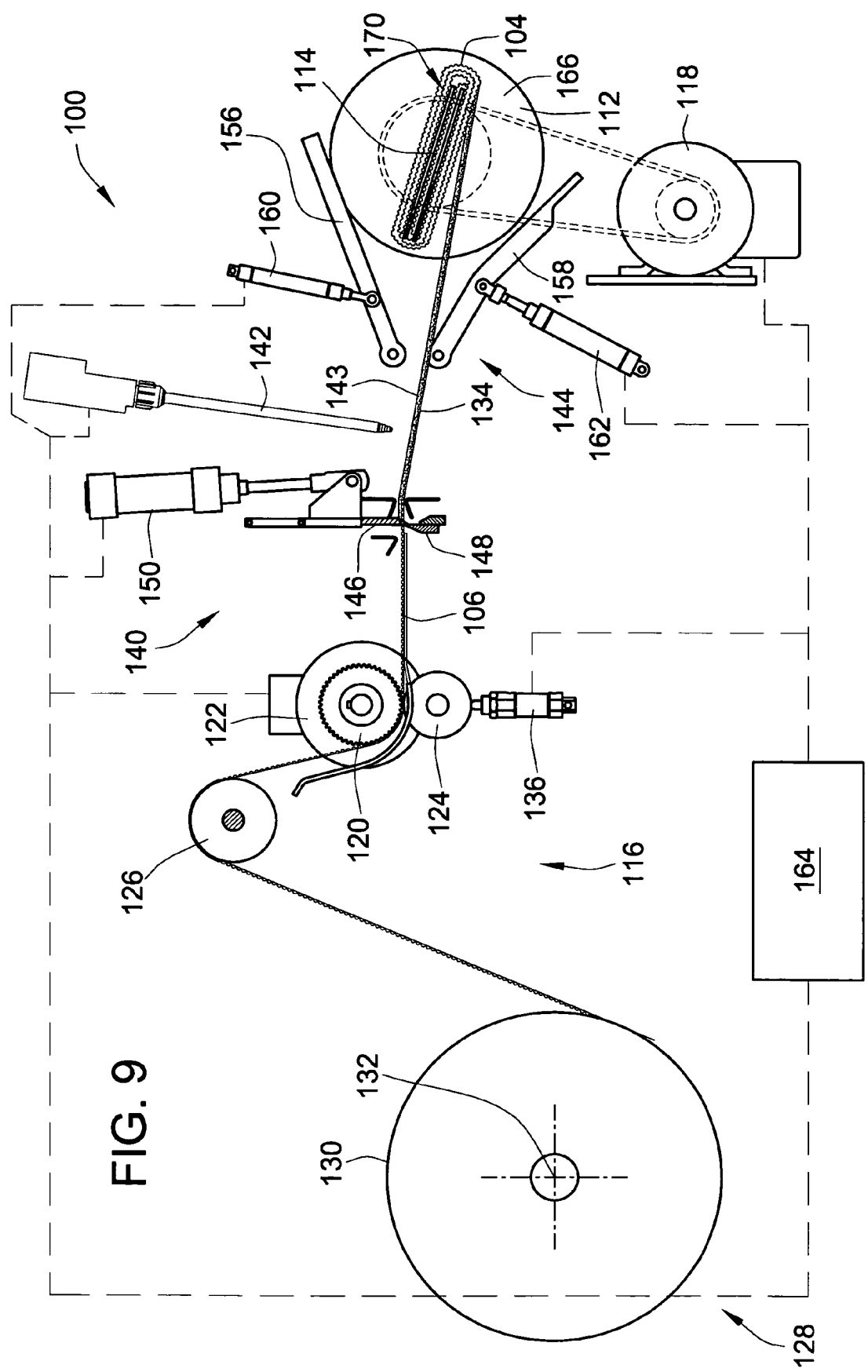
Figure 10:
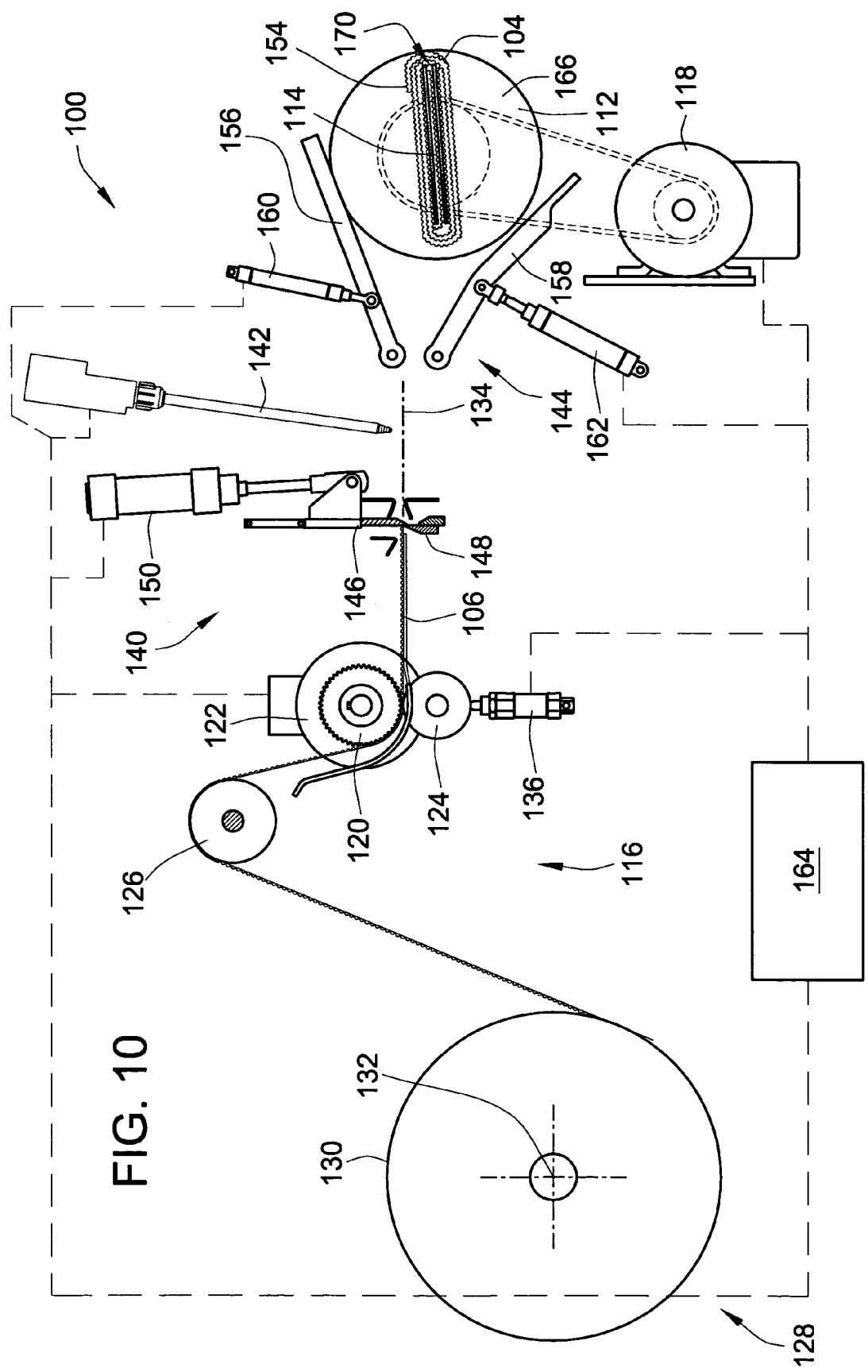

As shown in FIG. 8, the web drive motor 122 then reverses and draws the web back through the cutter 140 a distance equal to the over-travel distance D, and positions a second peak 105 of the web 106 directly under the cutter 140. As shown in FIG. 9, the cutter 140 is actuated to sever the web 106 and form the trailing edge 154, as shown by dashed lines in FIG. 8. As shown in FIG. 10, the operator then jogs the mandrel 112 to wrap the distal end of the web 106 onto the filter pack 104, fills the half-peak at the trailing edge 154 of the web 106 with an adhesive/sealant, and removes completed the filter pack 104 from the mandrel 112 by actuating a mechanism (not shown) that moves the plates 166-168 of the mandrel 112 apart from one another to release the filter pack 104 from the channels 170, 172 of the mandrel 112. The completed filter pack 104 is then set aside of the adhesive/sealant 143, 113 to cure, and/or is sent on to subsequent operations, such as attaching resilient seals 174, or other components, such as the seal support frame 176, that may be required to complete fabrication of the filter element 102 including the filter pack 104, as shown in FIG. 15.

The operations described above may then be repeated to form the next filter pack 104. It should be noted, however, that the operations described above in relation to FIG. 1 need not be performed for subsequent filter packs, because, once the winding apparatus 100 has been initialized to properly form the leading edge 152 of the first filter pack 104 to be formed from a given master roll 130 of media, the operations described in relation to FIG. 9 will simultaneously form the trailing edge 154 of one filter pack 104 and the leading edge 152 of the next filter pack 104, as shown in FIG. 11.

Those having skill in the art will also recognize that, although invention has been described herein with reference to several exemplary embodiments, many other embodiments of the invention are possible.

For example, although all of the exemplary embodiments of the apparatus and methods described herein have focused on a media pack 104 having a core-less construction, the invention can also be used to form media packs 180, as shown in FIG. 17, having the media 108 coiled around a central core 182. Where it is desired to form media packs having a core, the core may be attached to the mandrel 112, for rotation therewith, and the leading edge 152 of the web 106 is attached to the core, prior to beginning winding, through the use of a wide variety of means including, but not limited to, taping the leading edge to the core, sliding the leading edge into a slot in the core, bonding the leading edge to the core with an adhesive, or mechanically fastening the leading edge to the core with one or more fastening devices.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. All geometric references such as "radial," "annular," "diametric," "concentric," "upper," "lower," "inner," "outer," "forward," "back," and the like, are exemplary only and are not to be construed as limitations on the invention.

No language in the specification should be construed as indicating any non-claimed element as essential to the practice of the invention.

Preferred embodiments of this invention are described herein, including the best mode known to the inventor for carrying out the invention. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for forming a filter element having a coiled web of fluted filter media, wherein the web of fluted filter media is fed in a feed direction along a feed path to a mandrel, and the fluted filter media includes a plurality of flutes forming alternating peaks and valleys extending transverse to the feed direction and defining a pitch of the web, the method comprising:

feeding out a length of the web in the feed direction;

severing the web a first time by cutting through the web at one of the peaks of the fluted filter material to form a leading edge of the web;

attaching the leading edge of the web to the mandrel;

feeding the web of fluted filter media at a controlled linear speed onto the mandrel while rotating the mandrel with a winding motor providing a controlled driving torque to the mandrel, to thereby maintain a controlled tension on the web of fluted filter media as the web is wound onto the mandrel;

while driving the mandrel with a controlled driving torque, feeding out a length of web equal to an integer multiple of the pitch of the web;

severing the web a second time by cutting through the web at a peak of the fluted filter material to form a trailing edge of the web;

severing the web the first and second time with a cutter disposed at a fixed location along the feed path, with respect to the mandrel; and applying an adhesive sealant to the web at a point located along the feed path between the cutter and the mandrel and spaced beyond an over-feed distance from the cutter in the feed direction, with the over-feed distance being equal to an integer multiple of the pitch of the web.

2. The method of claim 1, further comprising, drawing the web back past the cutter a distance equal to the over-feed distance, prior to severing the web the second time with the cutter.

3. A method for forming a filter element having a coiled web of fluted filter media, wherein the web of fluted filter media is fed in a feed direction along a feed path to the mandrel, and the fluted filter media includes a plurality of flutes forming alternating peaks and valleys extending transverse to the feed direction and defining a pitch of the web, the method comprising:

feeding the web of fluted filter media at a controlled, but not necessarily constant, linear speed onto a mandrel rotated by a winding motor providing a controlled, but not necessarily constant, driving torque to the mandrel, to thereby maintain a controlled, but not necessarily constant, tension on the web of fluted filter media as the web is wound onto the mandrel;

feeding out a length of the web in the feed direction;

severing the web a first time, by cutting through the web at one of the peaks of the fluted filter material using a cutter disposed at a fixed location along the feed path, with respect to the mandrel, to form a leading edge of the web;

attaching the leading edge of the web to the mandrel;

while driving the mandrel with a controlled driving torque, feeding out a length of web equal to an integer multiple of the pitch of the web;

severing the web a second time, by cutting through the web at a peak of the fluted filter material using the cutter disposed at the fixed location along the feed path, with respect to the mandrel, to form a trailing edge of the web;

prior to severing the web the second time, feeding out a length of web past the cutter including an over-feed distance from the cutter in the feed direction, with the over-feed distance being equal to an integer multiple of the pitch of the web; and drawing the web back past the cutter a distance equal to the over-feed distance, prior to severing the web the second time with the cutter.

4. The method of claim 3, further comprising, feeding out an initial length of the web, for attachment to the mandrel, prior to winding the web onto the mandrel.

5. The method of claim 4, further comprising, positioning a web guide between the cutter and the mandrel, after severing the web for the first time, for guiding the initial length of the web to the mandrel.

6. The method of claim 5, further comprising, removing the web guide prior to winding the web onto the mandrel.

7. The method of claim 5, further comprising, guiding the leading edge of the web into a channel in the mandrel.

8. The method of claim 7, further comprising, removing the web guide prior to winding the web onto the mandrel.

9. An apparatus for forming a filter element having a coiled web of fluted filter media, the fluted filter media includes a plurality of flutes forming alternating peaks and valleys extending transverse to a feed direction and defining a pitch of the web wherein the apparatus comprising:

a mandrel mounted for rotation about an axis of the mandrel;

a web feeder for feeding the web of fluted filter media at a controlled linear speed onto the mandrel in the feed direction along a feed path to the mandrel;

a winding motor operatively connected to the mandrel for providing a controlled driving torque to the mandrel, to thereby maintain a controlled tension on the web of fluted filter media as the web is wound onto the mandrel;

a cutter disposed along the feed path between the feeder and the mandrel, for severing the web a first time by cutting through the web at one of the peaks of the fluted filter media to form a leading edge of the web, with the cutter being disposed at a fixed location along the feed direction, with respect to the mandrel;

a controller operatively connected to the feeder, the cutter and the winding motor for controlling the feeder, cutter and winding motor in such a manner that, after the leading edge of the web is attached to the mandrel and the feeder feeds out a length of web equal to an integer multiple of the pitch of the web including an over-feed distance from the cutter in the feed direction, with the over-feed distance being equal to an integer multiple of the pitch of the web, while the winding motor drives the mandrel at a controlled driving torque, the cutter severs the web a second time by cutting through the web at a peak of the fluted filter media to form a trailing edge of the web; and an applicator for applying an adhesive sealant to the web at a point located along the feed path between the cutter and the mandrel and spaced beyond the over-feed distance.

10. The apparatus of claim 9, wherein the controller is further configured for causing the feeder to draw the web back past the cutter a distance equal to the over-feed distance, prior to severing the web the second time with the cutter.

11. The apparatus of claim 9, wherein the controller is further configured for causing the feeder to feed out an initial length of the web, for attachment to the mandrel, prior to winding the web onto the mandrel.

12. The apparatus of claim 11, wherein the apparatus further comprises a web guide that is selectively-positionable between the cutter and the mandrel, after severing the web for the first time, for guiding the initial length of the web to the mandrel.

13. The apparatus of claim 12, wherein the web guide is removable prior to winding the web onto the mandrel.

14. The apparatus of claim 12, wherein the mandrel includes a channel for receiving the leading edge of the web, and the web guide is adapted for guiding the leading edge of the web into a slot in the mandrel.

15. The apparatus of claim 14, wherein the web guide is removable prior to winding the web onto the mandrel.

* * * * *